United States Patent [19]

Doerr et al.

[11] Patent Number: 4,553,076
[45] Date of Patent: Nov. 12, 1985

[54] IDLE SPEED CONTROLLER IMPROVEMENT

[75] Inventors: Richard D. Doerr; J. Joseph Muller, both of St. Louis; William A. Green, St. Charles, all of Mo.

[73] Assignee: ACF Industries, Inc., New York, N.Y.

[21] Appl. No.: 657,990

[22] Filed: Oct. 5, 1984

[51] Int. Cl.[4] ............................................. H02P 1/22
[52] U.S. Cl. ................................ 318/282; 310/68 B; 318/466; 318/467
[58] Field of Search .............. 318/266, 282, 436, 467, 318/466; 310/68 B

[56] References Cited

U.S. PATENT DOCUMENTS

| | | | |
|---|---|---|---|
| 4,028,604 | 6/1977 | Togo et al. | 318/466 X |
| 4,078,198 | 3/1978 | Murakosi et al. | 318/282 X |
| 4,096,903 | 6/1978 | Ringle, III | 318/266 X |
| 4,131,830 | 12/1978 | Lee et al. | 318/266 |
| 4,132,939 | 1/1979 | Kameyama et al. | 318/282 X |
| 4,315,174 | 2/1982 | Doerr | 310/83 X |
| 4,417,185 | 11/1983 | Bullat | 318/466 X |

FOREIGN PATENT DOCUMENTS

| | | | |
|---|---|---|---|
| 57-65283 | 4/1982 | Japan | 318/282 |
| 57-85103 | 5/1982 | Japan | 318/467 |

Primary Examiner—B. Dobeck
Assistant Examiner—Bentsu Ro
Attorney, Agent, or Firm—J. Joseph Muller

[57] ABSTRACT

An improvement for a controller (C) for controlling the idle speed of an engine. A logic circuit (1) is responsive to the position of switches (S1, S2) and the direction in which an extendible and retractable member (T) is to be driven by a motor (M) to energize the motor. The logic circuit includes logic gate (3) responsive to both switches being open when the member is at its extreme extended position and the member is to be retracted to energize the motor to retract the member. The logic circuit also includes a logic gate (5) responsive to both the switches being open when the member is at its extreme retracted position and the member is to be extended to energize the motor to extend the member. The motor is thus energized to move the member in the appropriate direction even though a switch which should be closed is open due to dust or debris preventing switch closure.

15 Claims, 2 Drawing Figures

IDLE SPEED CONTROLLER IMPROVEMENT

BACKGROUND OF THE INVENTION

This invention relates to controllers for controlling the idle speed of an internal combustion engine and more particularly, to an improvement for such a controller.

U.S. Pat. No. 4,315,174 which issued Feb. 9, 1982, and is assigned to the same assignee as the present application, discloses an idle speed control actuator (ISCA) or idle speed controller. As disclosed in this patent, a pair of limit switches are utilized to indicate when an extendible and retractable member of the controller reaches the respective extended or retracted limit of its movement. These switches are incorporated in an electrical circuit for supplying power to a reversible d.c. motor which drives the member through an appropriate gear arrangement. The circuit is designed so, for example, when the member has reached its extreme extended position, the limit switch associated with this movement is open and this opens the circuit to prevent further application of power to the motor to drive the member in its extended direction. It does however allow application of power to the motor to drive the member in its retracting direction. The other switch operates in a similar manner. While the above design works in a satisfactory manner, there is the possibility of a limit switch not closing due to dust or similar particles preventing closure. In such happenstance, the movable member might reach an extreme position with both limit switches being open. If this does occur, it would be impossible to supply power to the motor to drive the motor in the opposite direction. What is needed, is a circuit by which the condition of both limit switches being open is sensed, but which enables the motor to be driven in the appropriate direction away from its extreme position if this condition does occur.

SUMMARY OF THE INVENTION

Among the several objects of the present invention may be noted the improvement in a controller for controlling the idle speed of an internal combustion engine; the provision of such improvement for allowing application of power to a reversible d.c. motor of the controller when a member, driven by the motor, is at an extreme position and switches monitoring the position of the member are in an open position whereby the member is driven in the direction away from its extreme position; the provision of such an improvement for sensing the status of the switches which signal when the member is at one of its extreme positions and also the direction in which the motor is to be driven in order to move the member; and, the provision of such an improvement for also sensing the condition of each switch separately as well as the direction in which the member is to be driven in order to energize the motor to drive the member in the appropriate direction when the switches are functioning normally.

Briefly, the improvement of the present invention is to a controller for controlling the idle speed of an internal combustion engine. The controller has a reversible d.c. motor, an extendible and retractable member, a first switch which is normally closed but which is opened by movement of the member as it approaches its extreme extended position and a second switch which is normally closed but which is opened by movement of the member as it approaches its extreme retracted position. The open or closed position of the switches relative to each other is such that both switches are closed when the member is at a position intermediate its extreme position, but one switch is closed and the other switch is open when the member is at a respective extreme position. A logic circuit is provided which is responsive to the position of the switches and the direction in which the member is to be driven by the motor, for energizing the motor. The logic circuit includes a logic gate responsive to both switches being open, when the member is at its extreme extended position and the member is to be retracted, to energize the motor and retract the member. Further, the logic circuit includes a gate responsive to both switches being open, when the member is at its extreme retracted position and the member is to be extended, to energize the motor so it extends the member. Thus, the motor is energized to move the member in the appropriate direction even though a switch, which should be closed, is open due to dust or debris preventing it from closing. Other objects and features will be in part apparent and in part pointed out hereinafter.

BRIEF DESCRIPTION OF THE DRAWINGS

Corresponding reference characters indicate corresponding parts in both views of the drawings.

DESCRIPTION OF A PREFERRED EMBODIMENT

Figures 1, 2:
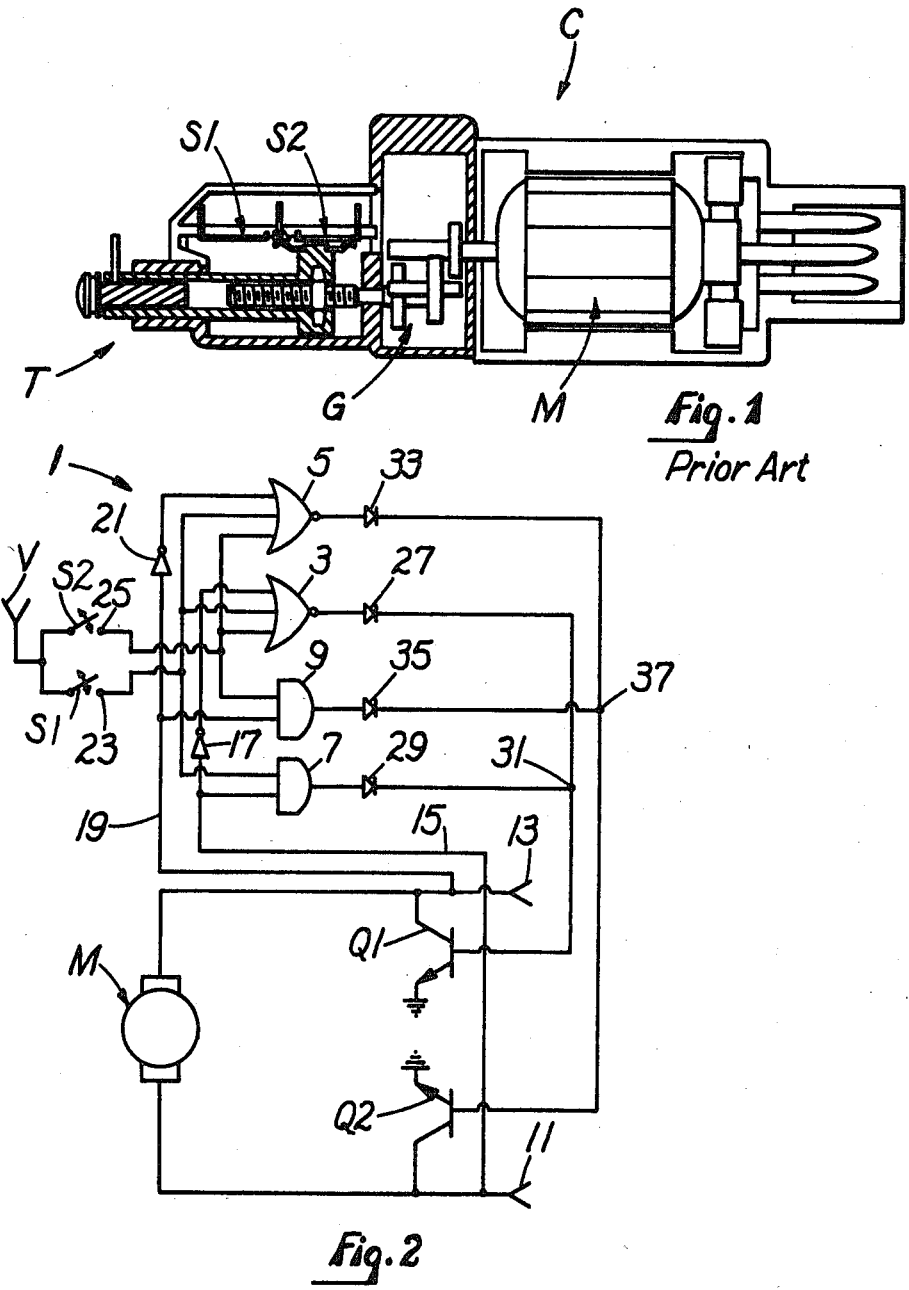
FIG. 1 is a sectional view of a controller for controlling the idle speed of an internal combustion engine; and, FIG. 2 is a schematic of an electrical circuit comprising the improvement of the present invention.

Referring to the drawings, a controller C for controlling the idle speed of an internal combustion engine (not shown) includes a reversible d.c. motor M and an extendible and retractable member indicated generally T. Motor M is driven in the appropriate direction to extend or retract member T through a gearing arrangement indicated generally G. Controller C further includes a first switch S1 which is normally closed but which is opened by movement of member T as it approaches its extreme extended position. The controller also includes a second switch S2 which is also normally closed but which is opened by movement of the member as it approaches its extreme retracted position. The position of switch S1 and S2 relative to each other is such that both switches are closed when member T is at a position intermediate its extreme extended and retracted positions, but one switch is closed and the other switch is open when the member is at a respective extreme position. Details of the construction of controller C are disclosed in U.S. Pat. No. 4,315,174 which is assigned to the same assignee as the present application.

As disclosed in the above referenced patent, switches S1 and S2 formed apart of an electrical circuit by which motor M is energized to be driven in the appropriate direction to extend or retract member T. The circuit was designed such that when one switch was open, because the member had been moved to its respective extreme position, the other switch was closed and this permitted power to be supplied to the motor to drive it in the appropriate direction to move member T in the opposite direction (the direction away from its extreme position). However, the possibility exist that when the member is driven to one of its extreme positions and its associated switch is open, the other switch might not be closed because dust or debris or other particles may prevent closure of the switch. In such instance, a circuit for motor M cannot be completed and the member cannot be driven in the direction away from its extreme extended or retracted position. Thus, the controller could not function to control the idle speed of an engine and the purpose for use of the controller would be defeated.

Referring to FIG. 2, the improvement of the present invention comprises logic means 1 responsive to the position of switches S1 and S2 and to the direction in which member T is to be driven by motor M for energizing the motor. Logic means 1 includes means 3 responsive to both switches being open when member T is at its extreme extended position and the member is to be retracted to energize the motor M so it retracts the member. Means 3 includes a NOR gate having three inputs. The first input is a logic level indicative of whether switch S1 is open or closed, a second input which is a logic level indicative of whether switch S2 is open or closed and as a third input a logic level indicative of whether motor M is to be driven in the direction to retract member T. The output of NOR gate 3 is supplied to an NPN transistor Q1 which functions as a driver.

Logic means 1 further includes a means 5 responsive to both switches being open when member T is at its extreme retracted position and the member is to be extended, to energize motor M so it extends the member. For this purpose, the logic means includes a second NOR gate having as a first input a logic level indicative of whether switch S1 is open or closed, a second input which is a logic level indicative of whether switch S2 is open or closed, and as a third input a logic level indicative of whether motor M is to extend member T. Gate 5 supplies a logic level output to activate motor M to extend member T only when the inputs to the gate indicate both switches are open and the motor is to be driven in the member extending direction. Gate 5 supplies its output to an NPN transistor Q2 which also functions as a driver.

Logic means 1 further includes a third logic gate which is an AND gate 7. Gate 7 has a first input a logic level indicative of whether switch S1 is open or closed and as a second input a logic level indicative of whether motor M is to extend member T. The gate supplies a logic level to activate the motor to extend member T when the inputs to the gate indicate switch S1 is closed and motor M is to be driven in the member extending direction. Also, logic means 1 includes a fourth logic gate which is an AND gate 9. Gate 9 has as a first input a logic level indicative of whether switch S2 is open or closed and as a second input a logic level indicative of whether motor M is to retract member T. Gate 9 supplies a logic level output to activate motor M to retract member T when the inputs to the gate indicate switch S2 is closed and motor M is to be driven in the member retracting direction.

As shown in FIG. 2, the circuit to energize motor M has two input terminals 11 and 13. When terminal 11 is high with respect to terminal 13, motor M is to be driven in the direction to extend member T. Conversely, when member T is to be retracted, terminal 13 is high with respect to terminal 11. A logic level, indicative of the relationship between terminal 11 and 13 is tapped off from terminal 11 via a line 15 and supplied to the one input of AND gate 7. This same signal is inverted by a INVERTER 17 and supplied as the third input to NOR gate 3. Similarly, a logic signal indicative of the relationship of terminal 13 to terminal 11 is provided by a line 19 as the second input to AND gate 9. This level is inverted by a INVERTER 21 and supplied as the third input to NOR gate 5. A contact element 23 of switch S1 is connected as one input to NOR gates 3 and 5 and as the first input to AND gate 7. Likewise, contact element 25 of switch S2 is connected as a second input to NOR gates 3 and 5 and as the first input to AND gate 9. The logic outputs of gates 3 and 7 are connected, via appropriate diodes 27 and 29, to a common connection point or node 31. The logic outputs of gates 5 and 9 are routed, via respective diodes 33 and 35, to a common connection point or node 37.

As thus described, the operation of logic means 1 is such that when member T is to be extended, terminal 11 is high with respect to terminal 13. If switch S1 is closed, AND gate 7 supplies a logic level output to turn on transistor Q1 and complete a circuit path to energize the motor. In this manner, member T can be driven to its fully extended position, at which time, switch S1 opens and the circuit for motor M is opened. If the member is to then be retracted, terminal 13 is high with respect to terminal 11. If switch S2 is closed, AND gate 9 supplies a logic level output to turn on transistor Q2 and complete a circuit for motor M so the motor will retract the member. If, however, both switch S1 and switch S2 are open at this time (switch S2 being open because dust or debris prevents the switch from closing), the open condition of both switches is sensed at the input to NOR gate 5, as well as the indication member T is to be retracted, and gate 5 supplies a logic level output to turn on transistor Q2 so member T can be retracted. Similarly, if the member were at its fully retracted position and were to be extended, but both switch S1 and S2 were open, then, NOR gate 3 would provide a logic level to turn on transistor Q1 so the member could be extended.

As thus described, logic means 1 provides circuitry by which member T can be driven in the appropriate direction depending upon the status of switches S1 and S2 and the direction in which it is desired to move the member. The circuit responds to both normal operating conditions in which the appropriate switches are opened and closed, as well as the extraordinary condition in which the member is at a extreme position, is to be driven in the opposite direction, but both switches are open due to dust, debris, or other particles preventing the switch which should be closed from being closed.

In view of the above, it will be seen that the several objects of the invention are achieved and other advantageous results obtained.

As various changes could be made in the above constructions without departing from the scope of the invention, it is intended that all matter contained in the above description and shown in the accompanying drawing shall be interpreted as illustrative and not in a limiting sense.

What is claimed is:

1. In a controller for controlling the idle speed of an internal combustion engine, the controller having a reversible d.c. motor, an extendible and retractable member, a first switch which is normally closed but which is opened by movement of the member as it approaches its extreme extended position and a second switch which is normally closed but which is opened by movement of the member as it approaches its extreme retracted position, the position of the switches relative to each other being such that both switches are closed when the member is at a position intermediate its extreme positions and one switch is closed and the other switch open when the member is at a respective extreme position, the improvement comprising; logic means responsive to the position of the switches and the direction in which the member is to be driven by the motor for energizing the motor, the logic means including means responsive to both switches being open when the member is at its extreme extended position and the member is to be retracted to energize the motor so it retracts the member; and, the logic means further including means responsive to both switches being open when the member is at its extreme retracted position and the member is to be extended to energize the motor so it extends the member whereby the motor is energized to move the member in the appropriate direction even though a switch which should be closed is open due to dust or debris preventing the switch from closing.

2. The improvement of claim 1 wherein the logic means includes a first logic gate having as a first input a logic level indicative of whether the first switch is open or closed, as a second input a logic level indicative of whether the second switch is open or closed, and as a third input a logic level indicative of whether the motor is to be driven in the member retracting direction, the gate supplying a logic level output to activate the motor to retract the member only when the inputs to the gate indicate both switches are open and the motor is to be driven in the member retracting direction.

3. The improvement of claim 2 wherein the logic means includes a second logic gate having as a first input a logic level indicative of whether the first switch is open or closed, as a second input a logic level indicative of whether the second switch is open or closed, and as a third input a logic level indicative of whether the motor is to be driven in the member extending direction, the second logic gate supplying a logic level output to activate the motor to extend the member only when the inputs thereto indicate both switches are open and the motor is to be driven in the member extending direction.

4. The improvement of claim 3 wherein the logic means further includes a third logic gate having as a first input a logic level indicative of whether the first switch is open or closed and as a second input a logic level indicative of whether the motor is to be driven in the member extending direction, the third logic gate supplying a logic level output to activate the motor to extend the member when the inputs thereto indicate the first switch is closed and the motor is to be driven in the member extending direction.

5. The improvement of claim 4 wherein the logic means further includes a fourth logic gate having as a first input a logic level indicative of whether the second switch is open or closed and as a second input a logic level indicative of whether the motor is to be driven in the member retracting direction, the fourth logic gate supplying a logic level output to activate the motor to retract the member when the inputs thereto indicate the second switch is closed and the motor is to be driven in the member retracting direction.

6. In a controller for controlling the idle speed of an internal combustion engine, the controller having a reversible d.c. motor, an extendible and retractable member, a first switch which is normally closed but which is opened by movement of the member as it approaches its extreme extended position and a second switch which is normally closed but which is opened by movement of the member as it approaches its extreme retracted position, the position of the switches relative to each other being such that both switches are closed when the member is at a position intermediate its extreme positions and one switch is closed and the other switch open when the member is at a respective extreme position, the improvement comprising: logic means responsive to the position of the switches and the direction in which the member is to be driven by the motor for energizing the motor to retract the member when the member is at its essentially fully extended position as signified by the first switch being open, the signal provided to the motor to drive he motor indicates the member is to be retracted, and the second switch, which should be closed, is open due to dirt or debris, whereby the member, which otherwise could not be retracted, is retracted.

7. The improvement of claim 6 wherein the logic means includes a first logic gate having as a first input a logic level indicative of whether the first switch is open or closed, as a second input a logic level indicative of whether the second switch is open or closed, and as a third input a logic level indicative of whether the motor is to be driven in the member retracting direction, the gate supplying a logic level output to activate the motor to retract the member only when the inputs to the gate indicate both switches are open and the motor is to be driven in the member retracting direction.

8. The improvement of claim 7 wherein the logic means includes a second logic gate having as a first input a logic level indicative of whether the first switch is open or closed, as a second input a logic level indicative of whether the second switch is open or closed, and as a third input a logic level indicative of whether the motor is to be driven in the member extending direction, the second logic gate supplying a logic level output to activate the motor to extend the member only when the inputs thereto indicate both switches are open and the motor is to be driven in the member extending direction.

9. The improvement of claim 8 wherein the logic means further includes a third logic gate having as a first input a logic level indicative of whether the first switch is open or closed and as a second input a logic level indicative of whether the motor is to be driven in the member extending direction, the third logic gate supplying a logic level output to activate the motor to extend the member when the inputs thereto indicate the first switch is closed and the motor is to be driven in the member extending direction.

10. The improvement of claim 9 wherein the logic means further includes a fourth logic gate having as a first input a logic level indicative of whether the second switch is open or closed and as a second input a logic level indicative of whether the motor is to be driven in the member retracting direction, the fourth logic gate supplying a logic level output to activate the motor to retract the member when the inputs thereto indicate the second switch is closed and the motor is to be driven in the member retracting direction.

11. In a controller for controlling the idle speed of an internal combustion engine, the controller having a reversible d.c. motor, an extendible and retractable member, a first switch which is normally closed but which is opened by movement of the member as it approaches its extreme extended position and a second switch which is normally closed but which is opened by movement of the member as it approaches its extreme retracted position, the position of the switches relative to each other being such that both switches are closed when the member is at a position intermediate its extreme positions and one switch is closed and the other switch is open when the member is at a respective extreme position, the improvement comprising: logic means responsive to the position of the switches and the direction in which the member is to be driven by the motor for energizing the motor to extend the member when the member is at its essentially fully retracted position as signified by the second switch being open, the signal provided to the motor to drive the motor indicates the member is to be extended and the first switch, which should be closed, is open due to dirt or debris, whereby the member, which otherwise could not be extended, is extended.

12. The improvement of claim 11 wherein the logic means includes a first logic gate having a first input a logic level indicative of whether the first switch is open or closed, as a second input a logic level indicative of whether the second switch is open or closed, and as a third input a logic level indicative of whether the motor is to be driven in the member extending direction, the gate supplying a logic level output to activate the motor to extend the member only when the inputs to the gate indicate both switches are open and the motor is to be driven in the member extending direction.

13. The improvement of claim 12 wherein the logic means includes a second logic gate having as a first input a logic level indicative of whether the first switch is open or closed, as a second input a logic level indicative of whether the second switch is open or closed, and as a third input a logic level indicative of whether the motor is to be driven in the member retracting direction, the second logic gate supplying a logic level output to activate the motor to retract the member only when the inputs thereto indicate both switches are open and the motor is to be driven in the member retracting direction.

14. The improvement of claim 13 wherein the logic means further includes a third logic gate having as a first input a logic level indicative of whether the first switch is open or closed and as a second input a logic level indicative of whether the motor is to be driven in the member extending direction, the third logic gate supplying a logic level output to activate the motor to extend the member when the inputs thereto indicate the first switch is closed and the motor is to be driven in the member extending direction.

15. The improvement of claim 14 wherein the logic means further includes a fourth logic gate having as a first input a logic level indicative of whether the second switch is open or closed and as a second input a logic level indicative of whether the motor is to be driven in the member retracting direction, the fourth logic gate supplying a logic level output to activate the motor to retract the member when the inputs thereto indicate the second switch is closed and the motor is to be driven in the member retracting direction.

* * * * *